US012560855B2

(12) United States Patent
    Fan et al.

(10) Patent No.: US 12,560,855 B2
(45) Date of Patent: Feb. 24, 2026

(54) OPTICAL MEMBER DRIVING MECHANISM

(71) Applicant: TDK TAIWAN CORP., Taoyuan (TW)

(72) Inventors: Kai-Po Fan, Taoyuan (TW); Wei-Jhe Shen, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 795 days.

(21) Appl. No.: 17/860,364

(22) Filed: Jul. 8, 2022

(65) Prior Publication Data

US 2024/0012311 A1      Jan. 11, 2024

(51) Int. Cl.
    *G03B 5/04*      (2021.01)
    *G02B 7/04*      (2021.01)
    *G02B 13/00*      (2006.01)
    *G02B 27/64*      (2006.01)

(52) U.S. Cl.
    CPC .................. *G03B 5/04* (2013.01); *G02B 7/04* (2013.01); *G02B 13/009* (2013.01); *G02B 27/646* (2013.01); *G03B 2205/0015* (2013.01); *G03B 2205/0046* (2013.01); *G03B 2205/0069* (2013.01)

(58) Field of Classification Search
    None
    See application file for complete search history.

(56) References Cited

U.S. PATENT DOCUMENTS 11,698,525 B2 *   7/2023   Tsai ................... G02B 13/0015
                                                       359/223.1
11,815,736 B2 *   11/2023   Hu ........................... G02B 7/10

| 11,899,274 | B2 * | 2/2024 | Hu | G02B 7/09 |
| 12,159,752 | B2 * | 12/2024 | Hu | H04N 23/51 |
| 12,174,449 | B2 * | 12/2024 | Weng | G02B 27/0068 |
| 12,181,658 | B2 * | 12/2024 | Tsai | G02B 13/0015 |
| 12,224,684 | B2 * | 2/2025 | Chen | H02N 2/025 |
| 2021/0096321 | A1 * | 4/2021 | Choi | G02B 7/09 |
| 2021/0132329 | A1 * | 5/2021 | Lim | G03B 3/10 |
| 2021/0247588 | A1 * | 8/2021 | Huang | H02K 41/0356 |
| 2021/0247605 | A1 * | 8/2021 | Hu | G02B 27/64 |
| 2021/0373278 | A1 * | 12/2021 | Kim | G03B 30/00 |
| 2022/0082789 | A1 * | 3/2022 | Hu | G03B 30/00 |
| 2022/0252827 | A1 * | 8/2022 | Lin | G02B 7/021 |
| 2022/0291475 | A1 * | 9/2022 | Kim | G02B 7/09 |
| 2022/0342177 | A1 * | 10/2022 | Huang | H04N 23/55 |

(Continued)

FOREIGN PATENT DOCUMENTS

CN          212009107 U      11/2020

OTHER PUBLICATIONS

Office Action mailed Sep. 6, 2022 in CN Application No. 202221764090. 8, 1 page.

*Primary Examiner* — Derek S. Chapel

(74) *Attorney, Agent, or Firm* — MUNCY, GEISSLER, OLDS & LOWE, P.C.

(57)          ABSTRACT

An optical member driving mechanism is provided, including a movable portion, a fixed portion, a driving assembly, and a guiding assembly. The movable portion is configured to connect an optical member, and is movable relative to the fixed portion. The driving assembly is configured to drive the movable portion to move relative to the fixed portion, and the movable portion moves relative to the fixed portion through the guiding assembly.

19 Claims, 10 Drawing Sheets

(56)         References Cited

U.S. PATENT DOCUMENTS

| | | | |
|---|---|---|---|
| 2023/0221520 A1* | 7/2023 | Chen ...................... | H10N 30/03 |
| | | | 359/822 |
| 2023/0225211 A1* | 7/2023 | Chen ...................... | H10N 30/85 |
| | | | 310/311 |
| 2023/0236386 A1* | 7/2023 | Cheng ................... | G03B 30/00 |
| | | | 359/824 |
| 2024/0077697 A1* | 3/2024 | Zhuang ................ | G02B 13/001 |
| 2024/0077744 A1* | 3/2024 | Zhuang ................... | G02B 7/09 |
| 2024/0241426 A1* | 7/2024 | Chen ........................ | G02B 7/08 |
| 2025/0067954 A1* | 2/2025 | Weng ...................... | G02B 7/04 |
| 2025/0102763 A1* | 3/2025 | Shen ................. | H02K 41/0354 |

* cited by examiner

10

OPTICAL MEMBER DRIVING MECHANISM

BACKGROUND OF THE INVENTION

Field of the Invention

The application relates in general to an optical member driving mechanism, and in particular, to an optical member driving mechanism having a guiding assembly.

Description of the Related Art

Advanced technology has allowed recent electronic devices (such as tablet computers and smartphones) to include a lens module capable of aiding in photography or recording video. These electronic devices have become more commonplace, and have been developed to be more convenient and thin. More and more choices are provided for users to choose from.

However, an image may come out blurry if the user shakes the lens module in the electronic device. To improve image quality, it is increasingly important to design a shockproof zoom lens module.

BRIEF SUMMARY OF INVENTION

An optical member driving mechanism is provided, including a movable portion, a fixed portion, a driving assembly, and a guiding assembly. The movable portion is configured to connect an optical member, and is movable relative to the fixed portion. The driving assembly is configured to drive the movable portion to move relative to the fixed portion, and the movable portion moves relative to the fixed portion through the guiding assembly.

In some embodiments, the guiding assembly includes a first guiding module, and the first guiding module includes a first guiding member, a first stabilizing member, and a second stabilizing member. The first guiding member is connected to the fixed portion. The first stabilizing member is disposed on the movable portion and in contact with the first guiding member at a first contact point. The second stabilizing member is disposed on the movable portion and in contact with the first guiding member at a second contact point, wherein the first contact point and the second contact point are on the side surface of the first guiding member.

In some embodiments, the first guiding member is a pillar with a central axis. A connection line between the first contact point and the central axis and a connection line between the second contact point and the central axis form an acute angle.

In some embodiments, the first guiding module further includes a third stabilizing member and a fourth stabilizing member. The third stabilizing member is disposed on the movable portion and in contact with the first guiding member at a third contact point. The fourth stabilizing member is disposed on the movable portion and in contact with the first guiding member at a fourth contact point, wherein the connection line of the first contact point and the third contact point is substantially parallel to the central axis, and the connection line of the second contact point and the fourth contact point is substantially parallel to the central axis.

In some embodiments, the first guiding member is separated from the movable portion.

In some embodiments, the first stabilizing member and the second stabilizing member are balls, and the first stabilizing member and the second stabilizing member are fixedly attached to the movable portion.

In some embodiments, the movable portion has a plurality of recesses, and the first stabilizing member and the second stabilizing member are accommodated in the recesses. The optical member driving mechanism further includes a sealing member, and the sealing member covers the recesses.

In some embodiments, the fixed member includes a base and a case, the first guiding member is affixed to the base and passes through a hole in the case. The cross-sectional area of the hole is larger than the cross-sectional area of the first guiding member.

In some embodiments, the guiding assembly further comprises a second guiding module, and the second guiding module comprises a second guiding member and a fifth stabilizing member. The second guiding member is connected to the fixed portion. The fifth stabilizing member is disposed on the movable portion and in contact with the second guiding member, wherein the first guiding module and the second guiding module are respectively disposed on different corners of the movable portion.

In some embodiments, the second guiding member is separated from the movable portion.

In some embodiments, the fifth stabilizing member is a ball, and is fixedly attached to the movable portion.

In some embodiments, the movable portion has a recess, and the fifth stabilizing member is accommodated in the recess. The optical member driving mechanism further includes a sealing member, and the sealing member covers the recess.

In some embodiments, the fixed member includes a base and the case, the second guiding member is affixed to the base and passes through a hole in the case. The cross-sectional area of the hole is larger than the cross-sectional area of the second guiding member.

In some embodiments, the movable portion comprises a first side and a second side opposite to the first side, and the distance between the first guiding member and the first side is less than the distance between the first guiding member and the second side. The driving assembly includes a first driving coil, a second driving coil, a first magnetic member, and a second magnetic member. The first driving coil is disposed on the first side of the movable portion. The second driving coil is disposed on the second side of the movable portion. The first magnetic member is disposed on the fixed portion and corresponds to the first driving coil. The second magnetic member is disposed on the fixed portion and corresponds to the second driving coil.

In some embodiments, the optical member driving mechanism further includes a permeability member disposed on the first side of the movable portion.

In some embodiments, the second magnetic member includes a first magnetic pole and a second magnetic pole, and the first magnetic pole and the second magnetic pole are arranged along the optical axis of the optical member, wherein in a direction of the optical axis, the thickness of the first magnetic pole is less than the thickness of the second magnetic pole.

In some embodiments, the optical member driving mechanism further includes a circuit component, and the circuit component includes a fixed section, an assembly section, and a connecting section. The fixed section is disposed on the fixed portion. The assembly section is disposed on the movable portion, and the first driving coil or the second driving coil is disposed on the assembly section. The connecting section is connected to the fixed section and the assembly section, and the connecting section is flexible.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

The making and using of the embodiments of the optical member driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
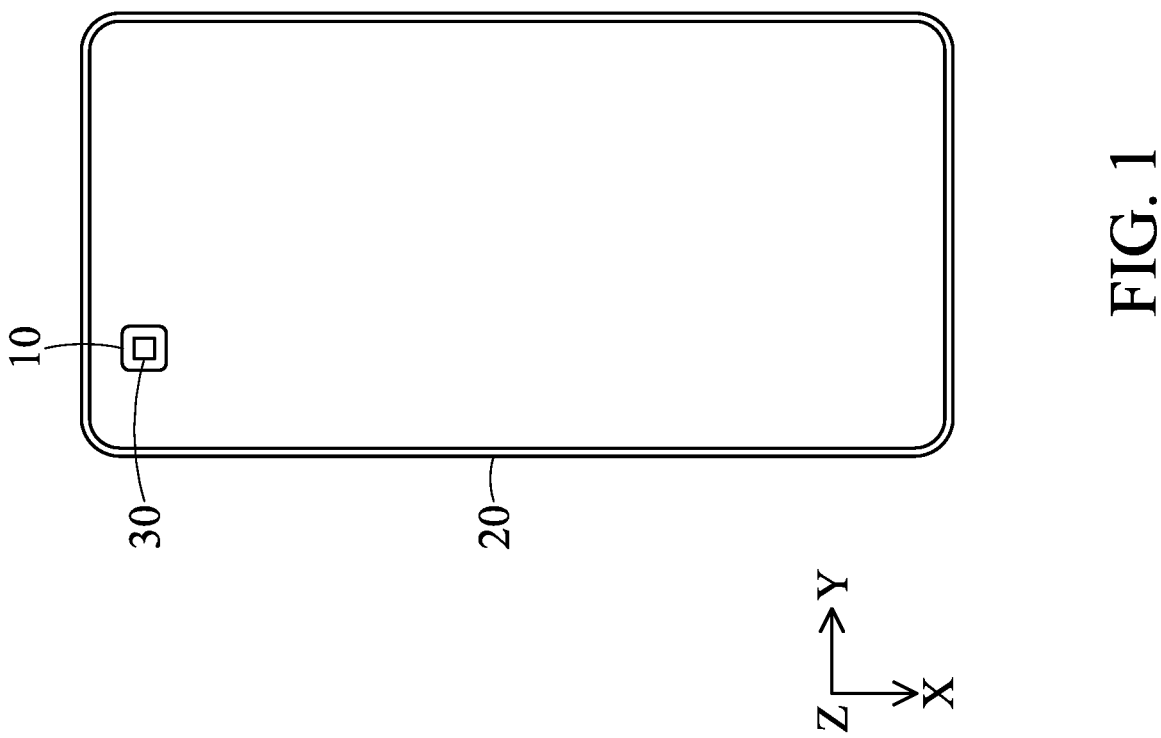
FIG. 1 is a schematic diagram of an electronic device according to an embodiment of the invention.

Referring to FIG. 1, in an embodiment of the invention, an optical member driving mechanism 10 can be disposed in an electronic device 20 to hold one or more optical members (such as an optical member 30) and drive the optical members to move, so as to achieve the purpose of focusing, zooming, and/or optical image stabilization (OIS). For example, the electronic device 20 can be a smartphone, a tablet computer, or a digital camera, and the optical member 30 can be a camera lens.

Figure 2:
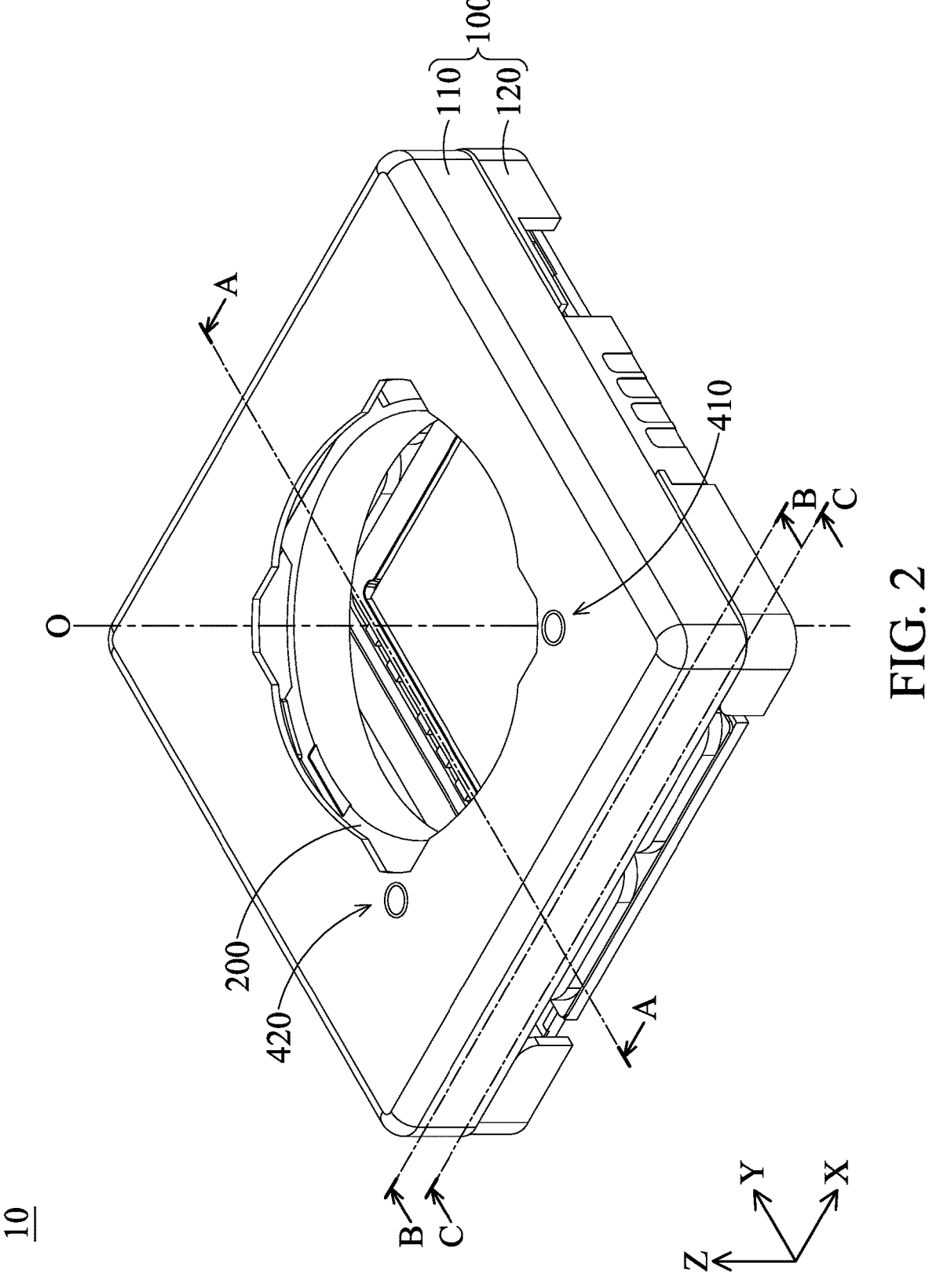
FIG. 2 is a schematic diagram of an optical member driving mechanism according to an embodiment of the invention.
Figure 3:
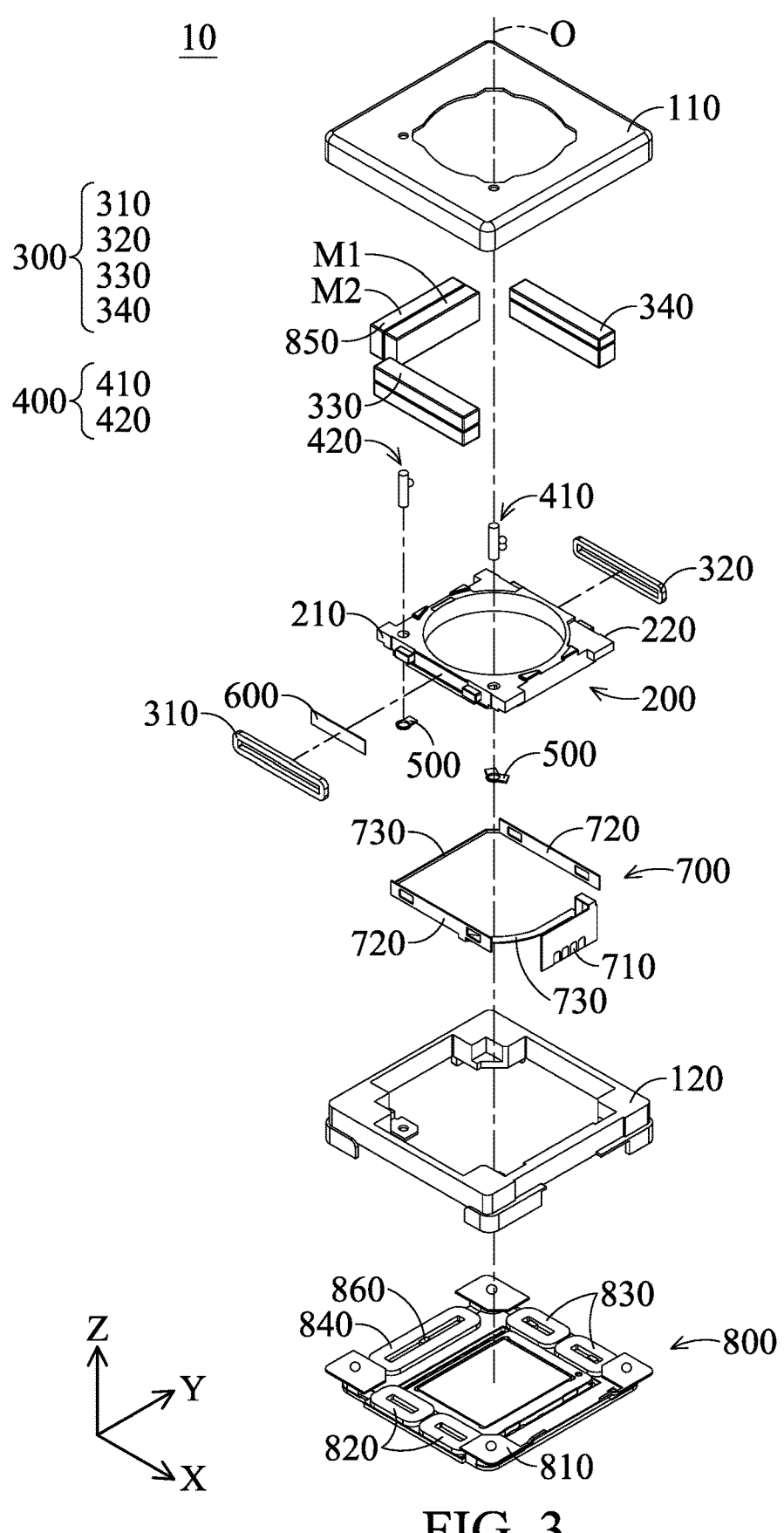
FIG. 3 is an exploded-view diagram of the optical member driving mechanism according to an embodiment of the invention.

FIG. 2 is a schematic diagram of the optical member driving mechanism 10, and FIG. 3 is an exploded-view diagram of the optical member driving mechanism 10. As shown in FIG. 2 and FIG. 3, the optical member driving mechanism 10 primarily includes a fixed portion 100, a movable portion 200, a driving assembly 300, a guiding assembly 400, at least one sealing member 500, a permeability member 600, an circuit component 700, and an image sensor holding assembly 800.

The fixed portion 100 includes a case 110 and a base 120. The case 110 and the base 120 can be engaged with each other and surround the movable portion 200, the driving assembly 300, the guiding assembly 400, the sealing member 500, the permeability member 600, the circuit component 700, and the image sensor holding assembly 800. Thus, the aforementioned members can be prevented from impacting by other component(s) in the electronic device 20 and failing when the electronic device 20 is oscillated. For example, the case 110 and the base 120 can include metal, but it is not limited thereto.

Figure 4A:
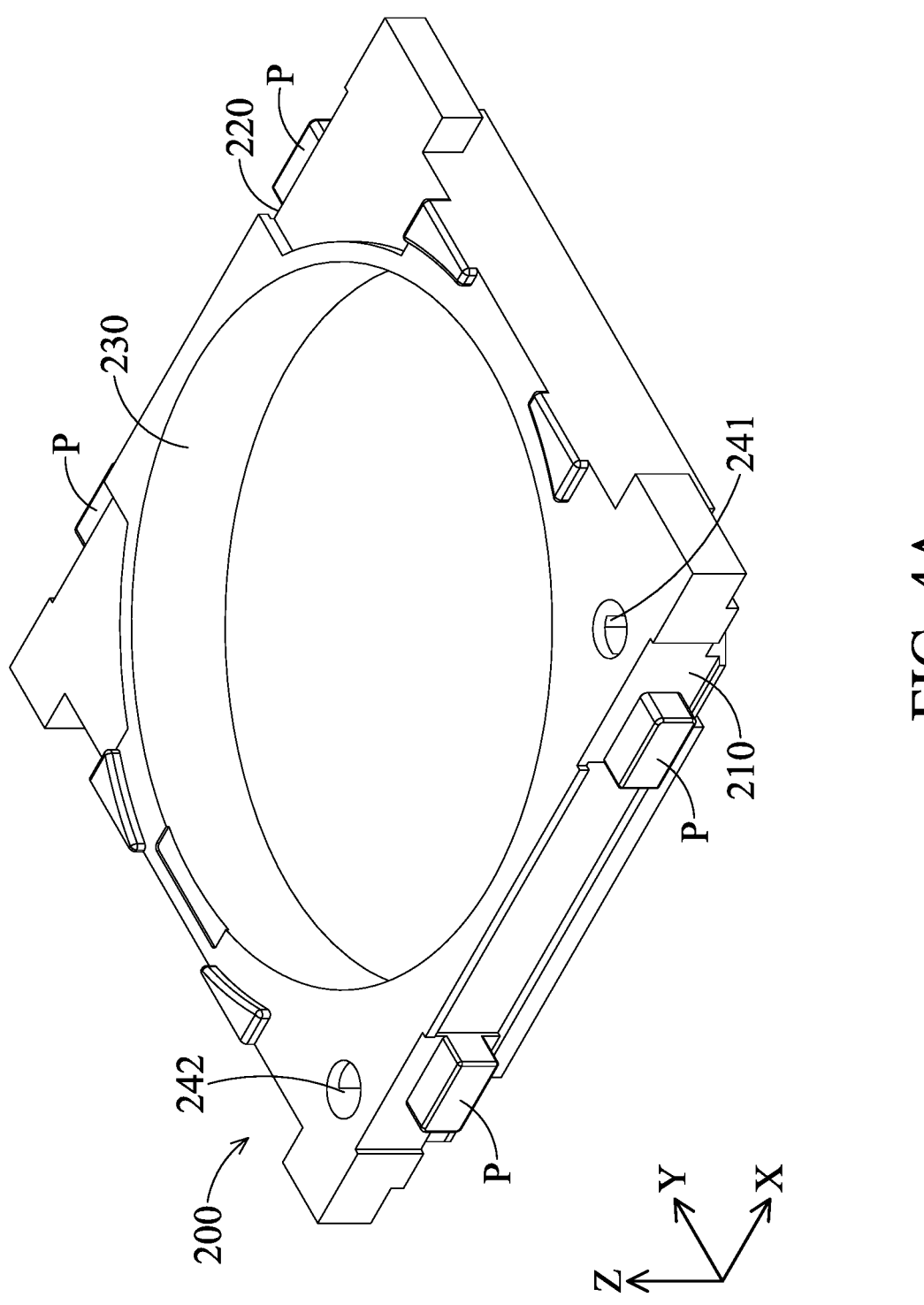
FIG. 4A is a schematic diagram of a movable portion according to an embodiment of the invention.

Referring to FIG. 3 and FIG. 4A, the movable portion 200 can be an optical member holder including a first side 210 and a second side 220. The first side 210 is opposite to the second side 220, and an accommodating hole 230 is formed between the first side 210 and the second side 220. The optical member 30 can be fixedly disposed in the accommodating hole 230. Moreover, two through holes 241 and 242 are further formed on the optical member holder. The through holes 241 and 242 are adjacent to the first side 210. In other words, the distance between the first side 210 and the through holes 241 and 242 is less than the distance between the second side 220 and the through holes 241 and 242.

Figure 4B:
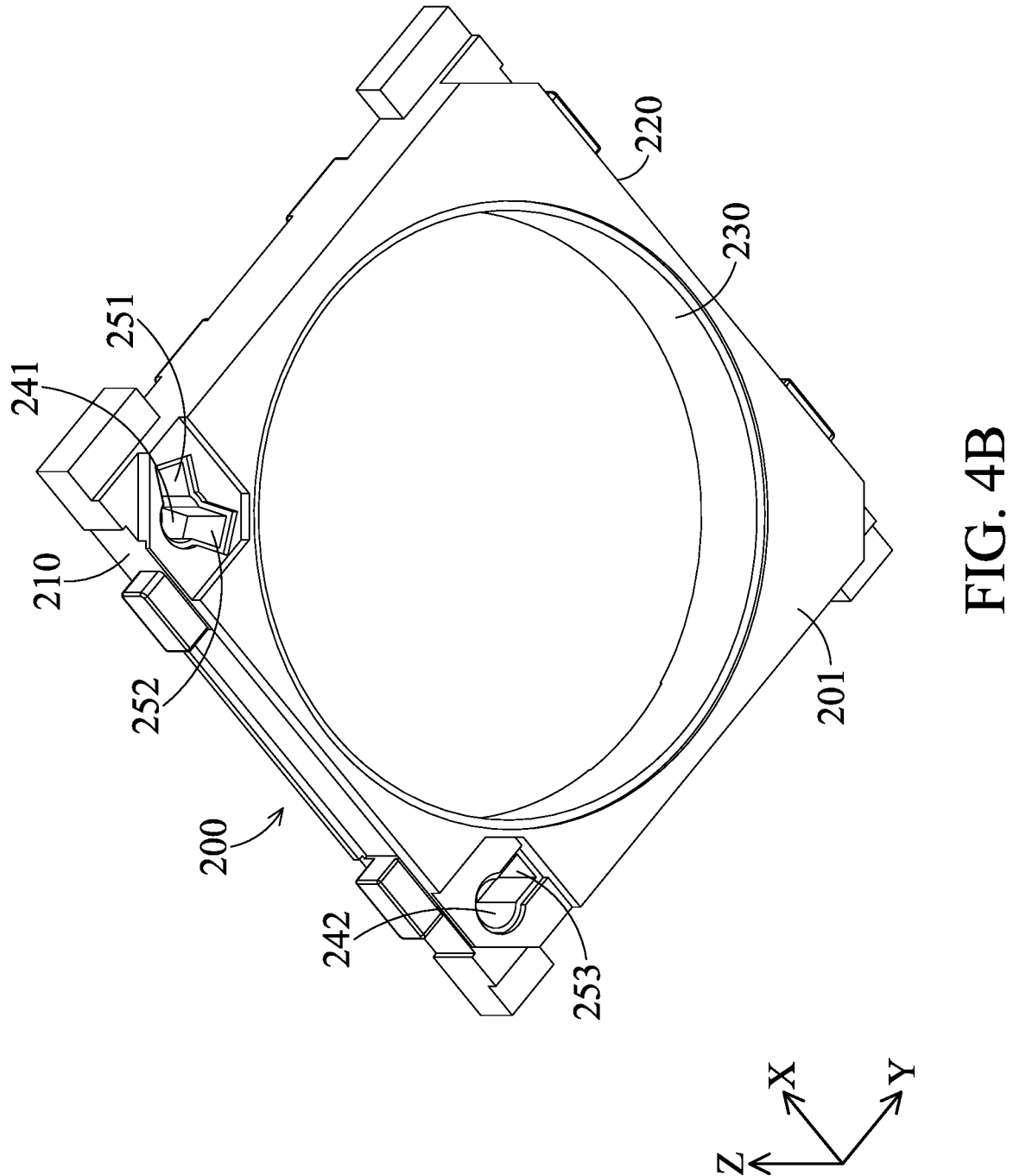
FIG. 4B is a schematic diagram of the movable portion in another view according to an embodiment of the invention.

As shown in FIG. 4B, in this embodiment, a plurality of recesses 251, 252, 253 are formed on the optical member holder. The recesses 251, 252, 253 can be communicated with the through hole 241 or the through hole 252 (for example, in this embodiment, the recesses 251 and 252 are communicated with the through hole 241, and the recess 253 is communicated with the through hole 242), and can be communicated with an external environment from theirs inlets that are located on a lower surface 201 of the optical member holder.

Figure 5:
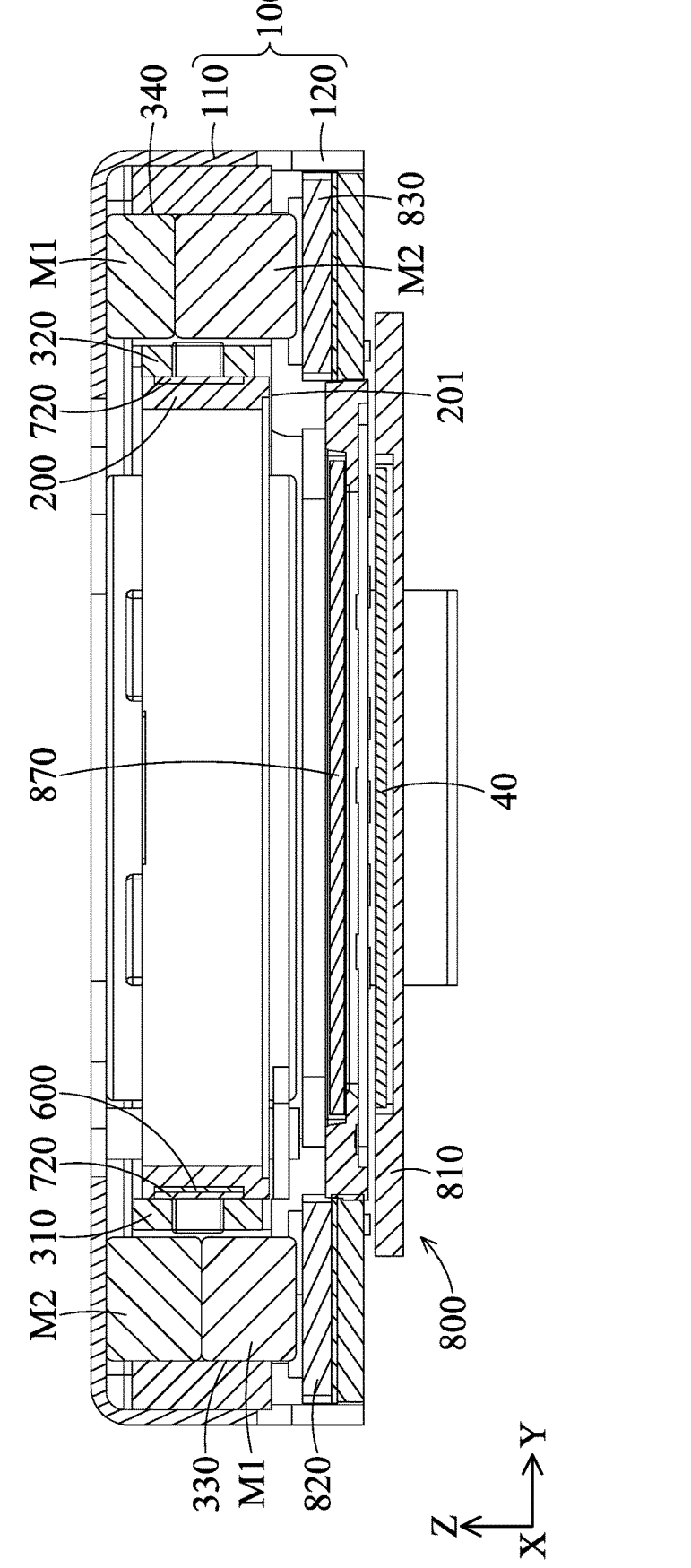
FIG. 5 is a cross-sectional view taken along the line A-A in FIG. 2.
Figure 6A:
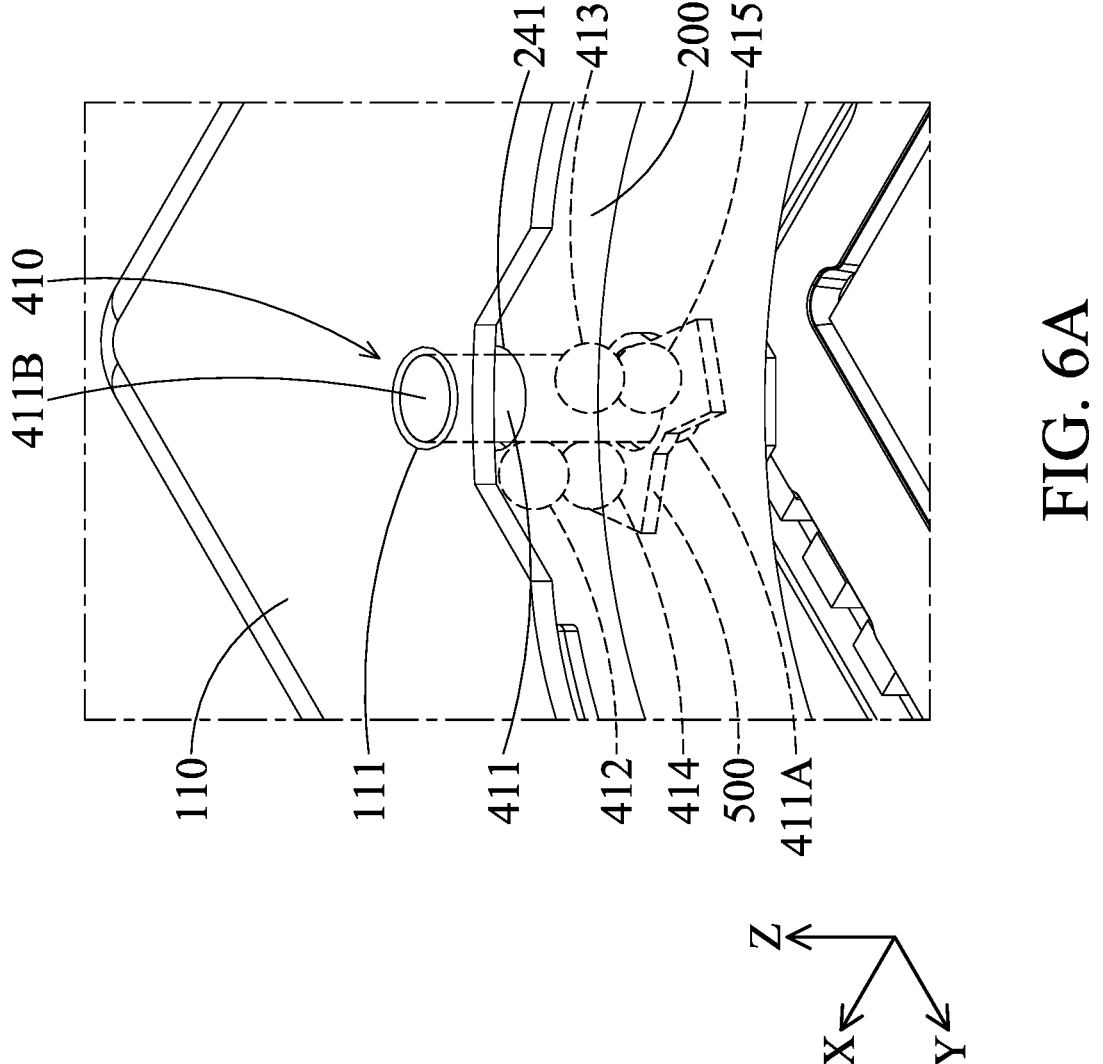
FIG. 6A is a schematic diagram of a first guiding module according to an embodiment of the invention.
Figure 6B:
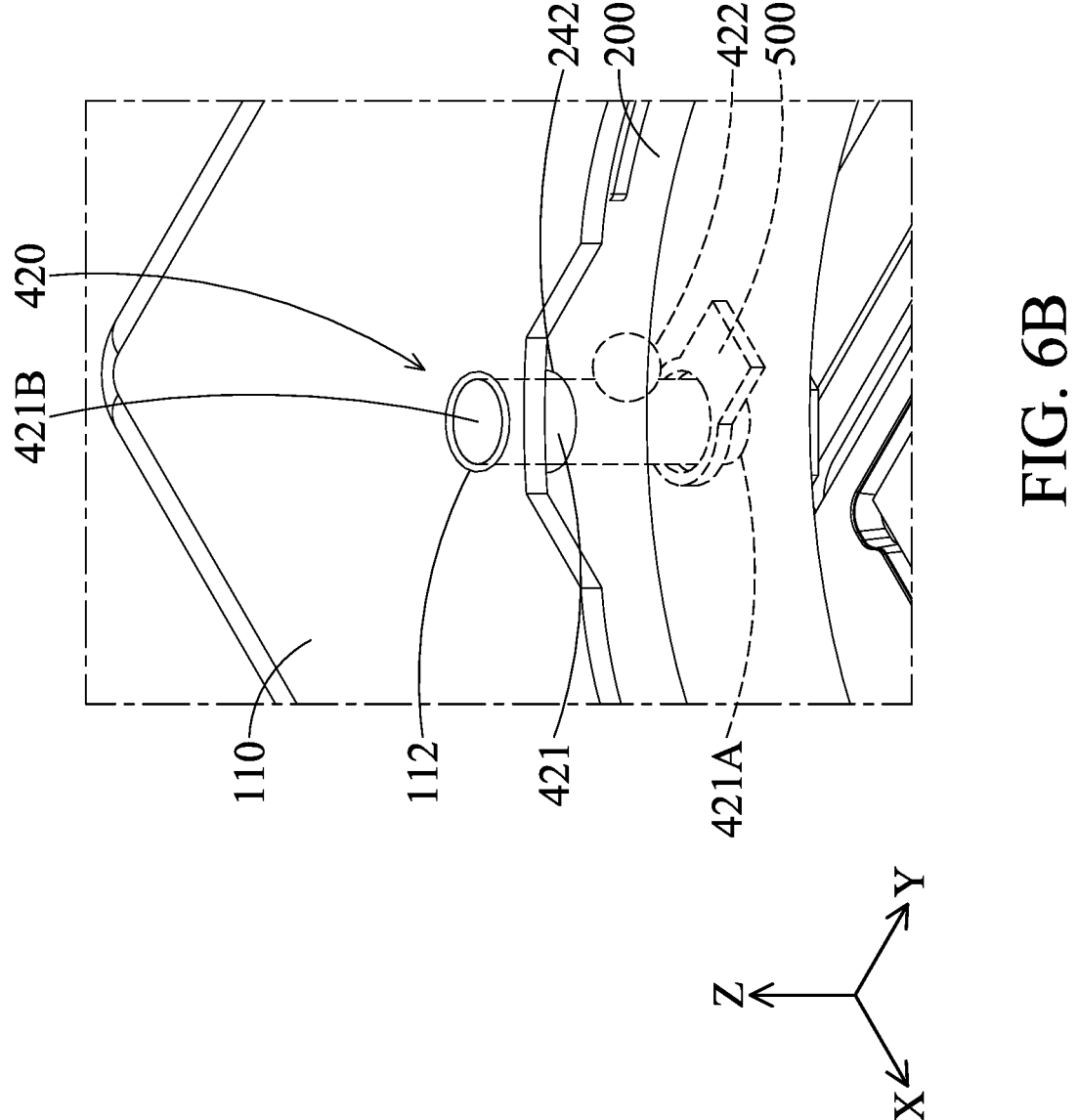
FIG. 6B is a schematic diagram of a second guiding module according to an embodiment of the invention.
Figure 6C:
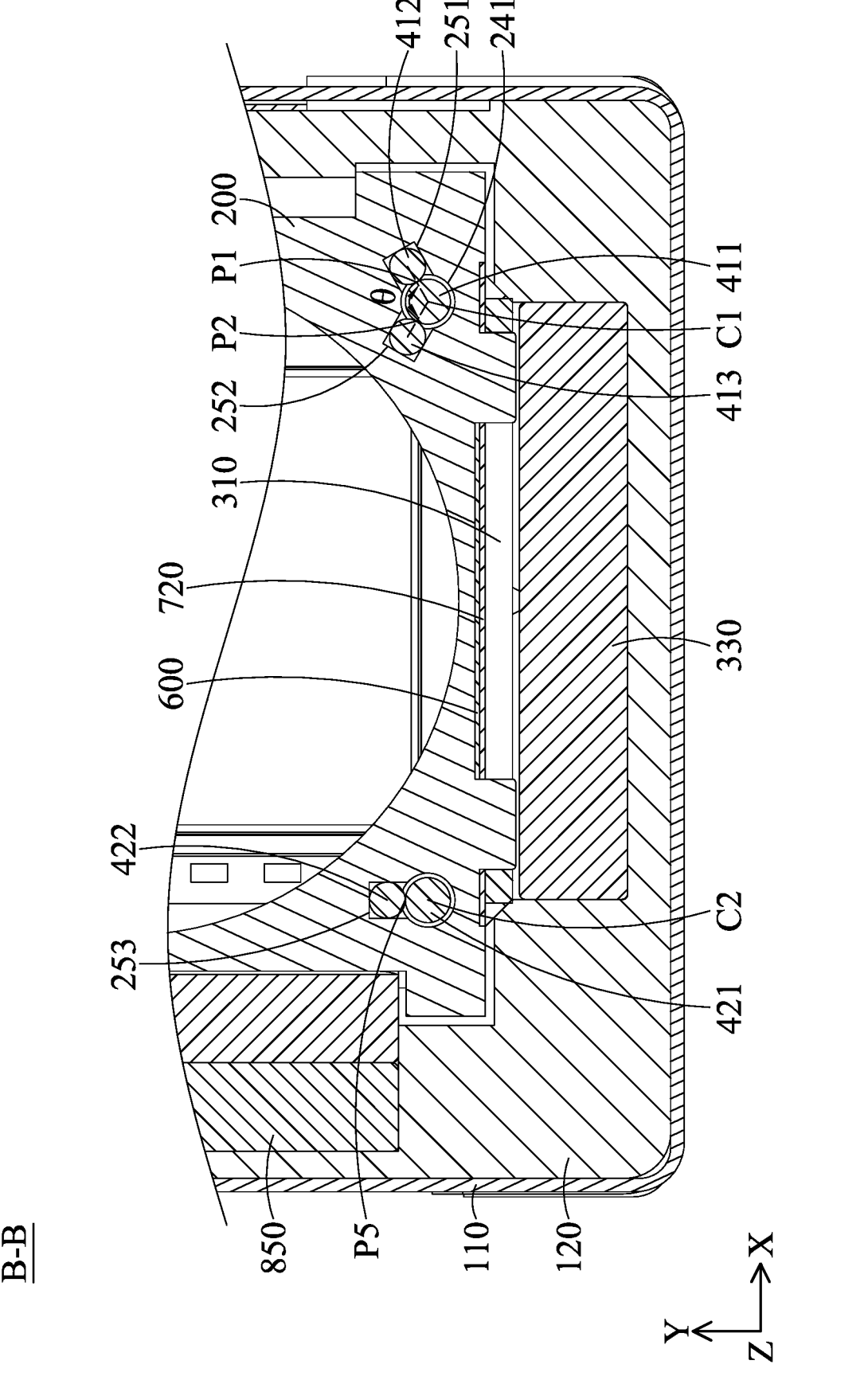
FIG. 6C is a cross-sectional view taken along the line B-B in FIG. 2.
Figure 6D:
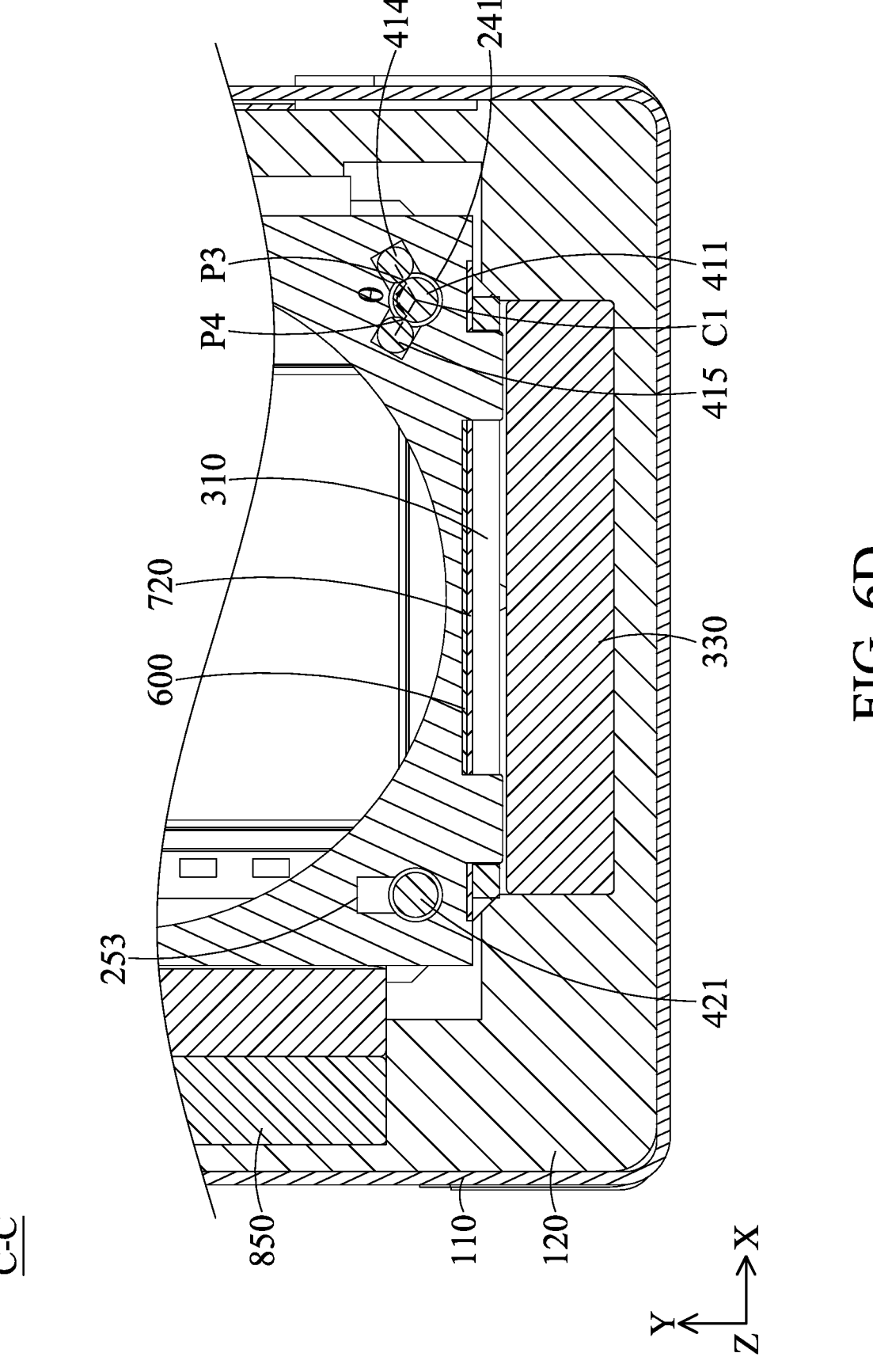
FIG. 6D is a cross-sectional view taken along the line C-C in FIG. 2.

Referring to the FIG. 3 and FIG. 5, the driving assembly 300 includes a first driving coil 310, a second driving coil 320, a first magnetic member 330, and a second magnetic member 340. The first driving coil 310 and the second driving coil 320 are respectively disposed on the first side 210 and the second side 220 of the movable portion 200. The first magnetic member 330 and the second magnetic member 340 are disposed on the base 120 and respectively correspond to the first driving coil 310 and the second driving coil 320.

Owing to the electromagnetic effect between the first and second driving coils 310 and 320 and the first and second magnetic members 330 and 340, the movable portion 200 and the optical member 30 disposed thereon can be driven to move relative to the fixed portion 100 along the optical axis O of the optical member 30. For example, when current flows through the first driving coil 310 and the second driving coil 320, the electromagnetic effect is generated between the first driving coil 310 and the first magnetic members 330, and the electromagnetic effect is generated between the second driving coil 320 and the second magnetic members 340. The aforementioned electromagnetic effect can provide a driving force to the movable portion 200, the movable portion 200 and the optical member 30 disposed thereon can move relative to the fixed portion 100 along the optical axis O of the optical member 30, and the purpose for adjusting the focus (focusing and/or zooming) can be therefore achieved.

Referring to FIG. 2, FIG. 3, and FIGS. 6A-6D, the guiding assembly 400 includes a first guiding module 410 and a second guiding module 420. The first guiding module 410 and the second guiding module 420 are adjacent to the first side 210 of the movable portion 200, and are disposed on the different corners of the movable portion 200.

The first guiding module 410 includes a first guiding member 411, a first stabilizing member 412, a second stabilizing member 413, a third stabilizing member 414, and a fourth stabilizing member 415. The first guiding member 411 can be a pillar, and it can pass through the through hole 241 of the movable portion 200. Since the distance between the through hole 241 and the first side 210 is less than the distance between the through hole 241 and the second side 220, the distance between the first guiding member 411 and the first side 210 is less than the distance between the first guiding member 411 and the second side 220.

One end 411A of the first guiding member 411 is affixed to the base 120, and the other end 411B of the first guiding member 411 passes through a hole 111 in the case 110. In this embodiment, the cross-sectional area of the through hole 241 in the X-Y plane and the cross-sectional area of the hole 111 in the X-Y plane are larger than the cross-sectional area of the first guiding member 411 in the X-Y plane. Thus, the first guiding member 411 does not directly contact the inner wall of the through hole 241 and the inner wall of the hole 111. The first guiding member 411 and the case 110 can include the same material. After the end 411B of the first guiding member 411 passes through the hole 111, the end 411B of the first guiding member 411 can be affixed to the case 110 by laser welding.

Each of the first stabilizing member 412, the second stabilizing member 413, the third stabilizing member 414, and the fourth stabilizing member 415 can be a ball. The first stabilizing member 412 and the third stabilizing member 414 are accommodated in the recess 251 of the movable portion 200, and are arranged along the optical axis O. The second stabilizing member 413 and the fourth stabilizing member 415 are accommodated in the recess 252 of the movable portion 200, and are arranged along the optical axis O. The first stabilizing member 412, the second stabilizing member 413, the third stabilizing member 414, and the fourth stabilizing member 415 can be fixedly attached to the movable portion 200 by glue. In other words, the first stabilizing member 412, the second stabilizing member 413, the third stabilizing member 414, and the fourth stabilizing member 415 do not enable to roll or move relative to the movable portion 200. When the first stabilizing member 412, the second stabilizing member 413, the third stabilizing member 414, and the fourth stabilizing member 415 are accommodated in the recesses 251 and 252 and affixed by glue, the sealing member 500 can connect to the movable portion 200 and cover the inlets of the recesses 251 and 252 on the lower surface 201 of the movable portion 200, so as to prevent the first stabilizing member 412, the second stabilizing member 413, the third stabilizing member 414, and the fourth stabilizing member 415 from dropping from the inlets due to the loosing.

When the first stabilizing member 412, the second stabilizing member 413, the third stabilizing member 414, and the fourth stabilizing member 415 are disposed on the movable portion 200 and the first guiding member 411 passes through the through hole 241 of the movable portion 200, each of the first stabilizing member 412, the second stabilizing member 413, the third stabilizing member 414, and the fourth stabilizing member 415 can be in contact with the first guiding member 411 in a single contact point. In detail, when the first guiding member 411 passes through the through hole 241 of the movable portion 200, the first guiding member 411 is separated from the movable portion 200, and the first stabilizing member 412, the second stabilizing member 413, the third stabilizing member 414, and the fourth stabilizing member 415 are respectively in contact with the first guiding member 411 at a first contact point P1, a second contact point P2, a third contact point P3, and a fourth contact point P4. In this embodiment, the connection line between the first contact point P1 and the third contact point P3 is substantially parallel to a central axis C1 of the first guiding member 411, the connection line between the second contact point P2 and the fourth contact point P4 is substantially parallel to the central axis C1 of the first guiding member 411, and the central axis C1 of the first guiding member 411 is substantially parallel to the optical axis O of the optical member 30. Moreover, an acute angle $\theta$ can be formed between the connection line of the first contact point P1 and the central axis C1 and the connection line of the second contact point P2 and the central axis C1, and the same acute angle $\theta$ can be formed between the connection line of the third contact point P3 and the central axis C1 and the connection line of the fourth contact point P4 and the central axis C1. For example, the acute angle $\theta$ can be in a range between 5 degrees to 85 degrees.

The second guiding module 420 includes a second guiding member 421 and a fifth stabilizing member 422. The second guiding member 421 can be a pillar, and it can pass through the through hole 242 of the movable portion 200. Since the distance between the through hole 242 and the first side 210 is less than the distance between the through hole 242 and the second side 220, the distance between the second guiding member 421 and the first side 210 is less than the distance between the second guiding member 421 and the second side 220. In this embodiment, the distance between the first guiding member 411 and the first side 210 is the same as the distance between the second guiding member 421 and the first side 210.

One end 421A of the second guiding member 421 is affixed to the base 120, and the other end 421B of the second guiding member 421 passes through a hole 112 in the case 110. In this embodiment, the cross-sectional area of the through hole 242 in the X-Y plane and the cross-sectional area of the hole 112 in the X-Y plane are larger than the cross-sectional area of the second guiding member 421 in the X-Y plane. Thus, the second guiding member 421 does not directly contact the inner wall of the through hole 242 and the inner wall of the hole 112. The second guiding member 421 and the case 110 can include the same material. After the end 421B of the second guiding member 421 passes through the hole 112, the end 421B of the second guiding member 421 can be affixed to the case 110 by laser welding.

The fifth stabilizing member 422 can be a ball. The fifth stabilizing member 422 can be accommodated in the recess 253 of the movable portion 200, and can be fixedly attached to the movable portion 200 by glue. Thus, the fifth stabilizing member 422 does not enable to roll or move relative to the movable portion 200. When the fifth stabilizing member 422 is accommodated in the recess 253 and affixed by glue, another sealing member 500 can connect to the movable portion 200 and cover the inlet of the recess 253 on the lower surface 201 of the movable portion 200, so as to prevent the fifth stabilizing member 422 from dropping from the inlets due to the loosing.

When the fifth stabilizing member 422 is disposed on the movable portion 200 and the second guiding member 421 passes through the through hole 242 of the movable portion 200, the fifth stabilizing member 422 can be in contact with the second guiding member 421 in a single contact point. In detail, when the second guiding member 421 passes through the through hole 242 of the movable portion 200, the second guiding member 421 is separated from the movable portion 200, and the fifth stabilizing member 422 is in contact with the second guiding member 421 at a fifth contact point P5. In this embodiment, the connection line of the fifth contact point and a central axis C2 of the second guiding member 421, the connection line of the first contact point P1 and the central axis C1, and the connection line of the second contact point P2 and the central axis C1 are disposed on the same plane.

Owing to the aforementioned structures of the first guiding module 410 and the second guiding module 420 of the guiding assembly 400, the friction generated in the movement of the movable portion 200 relative to the fixed portion 100 can be reduced. The movable portion 200 and the optical member 30 disposed thereon can move steadily. Furthermore, owing to the aforementioned structures of the first guiding module 410 and the second guiding module 420, the degree of freedom of the movable portion 200 can be restricted, so as to prevent the movable portion from overturning.

Referring to FIGS. 3, 5, 6C, and 6D, in this embodiment, the permeability member 600 can be disposed on the first side 210 of the movable portion 200 and correspond to the first magnetic member 330, the first guiding member 411 can be disposed between the first magnetic member 330 and first to fourth stabilizing members 412-415, and the second guiding member 421 can be disposed between the first magnetic member 330 and the fifth stabilizing member 422. Therefore, owing to the magnetic attraction force between the permeability member 600 and the first magnetic member 330, the first, second, third, fourth, and fifth stabilizing member 412, 413, 414, 415, and 422 can certainly abut the first guiding member 411 and the second guiding member 421. The movable portion 200 can be facilitated to be positioned and guided. Moreover, the permeability member 600 can also enhance the electromagnetic effect between the first driving coil 310 and the first magnetic member 330, so that the driving force can be increased. For example, the permeability member 600 can include ferrite material, resin material, and/or nanocrystalline material, but it is not limited thereto.

Referring to FIG. 3 and FIG. 5, the circuit component 700 includes a fixed section 710, at least one assembly section 720, and at least one connecting section 730. The fixed section 710 is affixed to the base 120. The fixed section 710 has a plurality of connecting terminals, and the components in the electronic device 20 can be connected to the circuit component 700 through the connecting terminals. The assembly section 720 is disposed on the movable portion 200, and the first driving coil 310 and the second driving coil 320 are disposed on the assembly section 720. The connecting section 730 is connected to the fixed section 710 and the assembly section 720, and is flexible. Therefore, the components in the electronic device 20 (such as the power supply (not shown)) can transmit current to the first driving coil 310 and the second driving coil 320. Since the connecting section 730 is flexible, when the movable portion 200 moves relative to the fixed portion 100, the electrical connection between the components in the electronic device 20 and the first driving coil 310 or the second driving coil 320 can be maintained.

In this embodiment, the assembly section 720 of the circuit component 700 can be positioned by protrusions P on the first side 210 and the second side 220 of the movable portion 200.

The image sensor holding assembly 800 is configured to hold and move an optical member 40 (such as an image sensor), it includes a carrier 810 and a plurality of driving coils 820 and 830. The optical member 40 and the driving coils 820 and 830 are disposed on the carrier 810, wherein the optical member 40 corresponds to the accommodating hole 230, and the driving coils 820 and 830 respectively correspond to the first magnetic member 330 and the second magnetic member 340. When current flows through the first driving coils 820 and 830, the electromagnetic effect is generated between the driving coil 820 and the first magnetic members 330, and the electromagnetic effect is generated between the driving coil 830 and the second magnetic members 340. The aforementioned electromagnetic effect can provide a driving force to the carrier 810, the carrier 810 and the optical member 40 disposed thereon can move along the X-axis and/or the Y-axis, and the purpose of optical image stabilization can be therefore achieved.

Specifically, in this embodiment, the thicknesses and the arrangement of the magnetic poles of the first magnetic member 330 and the second magnetic member 340 are different. In detail, the first magnetic pole M1 (such as the N pole) of the first magnetic member 330 is disposed between the second magnetic pole M2 (such as the S pole) of the first magnetic member 330 and the image sensor holding assembly 800, and the second magnetic pole M2 (such as the S pole) of the second magnetic member 340 is disposed between the first magnetic pole M1 (such as the N pole) of the second magnetic member 340 and the image sensor holding assembly 800. In the direction of the optical axis O, the thickness of the first magnetic pole M1 of the first magnetic member 330 is the same as the thickness of the second magnetic pole M2 of the first magnetic member 330, and the thickness of the first magnetic pole M1 of the second magnetic member 340 is less than the thickness of the second magnetic pole M2 of the second magnetic member 340. Therefore, the magnetic flux toward the image sensor holding assembly 800 can be increased, and the driving force for driving the carrier 810 can be enhanced.

In this embodiment, the image sensor holding assembly 800 can further include a driving coil 840 and a magnetic member 850. The magnetic member 850 is disposed on a side of the base 120 where the first and the second magnetic members 330 and 340 are not disposed. The driving coil 840 is disposed on the carrier 810 and corresponds to the magnetic member 850. The arrangement of the magnetic poles of the magnetic member 850 is different from that of the first magnetic member 330 and the second magnetic member 340. In detail, the first magnetic pole M1 and the second magnetic pole M2 of the first magnetic member 330 and the second magnetic member 340 are arranged along the optical axis O, and the first magnetic pole M1 and the second magnetic pole M2 of the first magnetic member 850 are arranged along a direction that is perpendicular to the optical axis O (the X-axis). Thus, the driving force for driving the carrier 810 can be further enhanced.

In this embodiment, the image sensor holding assembly 800 can further include a sensing member 860 and a filter 870. The sensing member 860 is disposed on the carrier 810, and can detect the relative position of the magnetic member 850 and the sensing member 860 to determine the movement of the carrier 810. For example, the sensing member 860 can be a hall sensor, a magnetoresistance effect sensor (MR sensor), a giant magnetoresistance effect sensor (GMR sensor), a tunneling magnetoresistance effect sensor (TMR sensor), or a fluxgate sensor. The filter is disposed between the accommodating hole 230 and the optical member 40. Therefore, when the optical member 30 is assembled on the optical member driving mechanism 10, the light can passes through the optical member 30 and the filter 870 in sequence and reaches the optical member 40.

In summary, an optical member driving mechanism is provided, including a movable portion, a fixed portion, a driving assembly, and a guiding assembly. The movable portion is configured to connect an optical member, and is movable relative to the fixed portion. The driving assembly is configured to drive the movable portion to move relative to the fixed portion, and the movable portion moves relative to the fixed portion through the guiding assembly.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical member driving mechanism, comprising:
   a movable portion, configured to be connected to an optical member;
   a fixed portion, wherein the movable portion is movable relative to the fixed portion;
   a driving assembly, configured to drive the movable portion to move relative to the fixed portion; and
   a guiding assembly, wherein the movable portion moves relative to the fixed portion through the guiding assembly,
   wherein the guiding assembly comprises a first guiding module, and the first guiding module comprises:
      a first guiding member, connected to the fixed portion;
      a first stabilizing member, disposed on the movable portion and in contact with the first guiding member at a first contact point; and
      a second stabilizing member, disposed on the movable portion and in contact with the first guiding member at a second contact point, wherein the first contact point and the second contact point are on a side surface of the first guiding member, wherein the guiding assembly comprises a second guiding module, and the second guiding module comprises:
      a second guiding member, connected to the fixed portion; and
      a fifth stabilizing member, disposed on the movable portion and in contact with the second guiding member, wherein the first guiding module and the second guiding module are adjacent to a same side of the movable portion, and
   wherein a connecting line between a center of the second guiding member and a center of the fifth stabilizing member is not parallel to a connecting line between a center of the first guiding member and a center of the first stabilizing member, and is not parallel to a connecting line between the center of the first guiding member and a center of the second stabilizing member, and wherein the connecting line between the center of the first guiding member and the center of the first stabilizing member forms an acute angle with the connecting line between the center of the first guiding member and the center of the second stabilizing member.

2. The optical member driving mechanism as claimed in claim 1, wherein the first guiding member is a pillar with a central axis.

3. The optical member driving mechanism as claimed in claim 2, wherein a connection line between the first contact point and the central axis and a connection line between the second contact point and the central axis form an acute angle.

4. The optical member driving mechanism as claimed in claim 2, wherein the first guiding module further comprises:
   a third stabilizing member, disposed on the movable portion and in contact with the first guiding member at a third contact point; and
   a fourth stabilizing member, disposed on the movable portion and in contact with the first guiding member at a fourth contact point, wherein a connection line of the first contact point and the third contact point is substantially parallel to the central axis, and a connection line of the second contact point and the fourth contact point is substantially parallel to the central axis.

5. The optical member driving mechanism as claimed in claim 1, wherein the first guiding member is separated from the movable portion.

6. The optical member driving mechanism as claimed in claim 1, wherein the first stabilizing member and the second stabilizing member are balls.

7. The optical member driving mechanism as claimed in claim 6, wherein the first stabilizing member and the second stabilizing member are fixedly attached to the movable portion.

8. The optical member driving mechanism as claimed in claim 1, wherein the movable portion has a plurality of recesses, and the first stabilizing member and the second stabilizing member are accommodated in the recesses, wherein the optical member driving mechanism further comprises a sealing member, and the sealing member covers the recesses.

9. The optical member driving mechanism as claimed in claim 1, wherein the fixed member comprises a base and a case, the first guiding member is affixed to the base and passes through a hole in the case, wherein the cross-sectional area of the hole is larger than the cross-sectional area of the first guiding member.

10. The optical member driving mechanism as claimed in claim 1, wherein the first guiding module and the second guiding module are respectively disposed on different corners of the movable portion.

11. The optical member driving mechanism as claimed in claim 10, wherein the second guiding member is separated from the movable portion.

12. The optical member driving mechanism as claimed in claim 10, wherein the fifth stabilizing member is a ball, and is fixedly attached to the movable portion.

13. The optical member driving mechanism as claimed in claim 10, wherein the movable portion has a recess, and the fifth stabilizing member is accommodated in the recess, wherein the optical member driving mechanism further comprises a sealing member, and the sealing member covers the recess.

14. The optical member driving mechanism as claimed in claim 10, wherein the fixed member comprises a base and the case, and the second guiding member is affixed to the base and passes through a hole in the case, wherein the cross-sectional area of the hole is larger than the cross-sectional area of the second guiding member.

15. The optical member driving mechanism as claimed in claim 1, wherein the movable portion comprises a first side and a second side opposite to the first side, and a distance between the first guiding member and the first side is less than a distance between the first guiding member and the second side, wherein the driving assembly comprises:

a first driving coil, disposed on the first side of the movable portion;

a second driving coil, disposed on the second side of the movable portion;

a first magnetic member, disposed on the fixed portion and corresponding to the first driving coil; and a second magnetic member, disposed on the fixed portion and corresponding to the second driving coil.

16. The optical member driving mechanism as claimed in claim 15, wherein the optical member driving mechanism further comprises a permeability member disposed on the first side of the movable portion.

17. The optical member driving mechanism as claimed in claim 15, wherein the second magnetic member comprises a first magnetic pole and a second magnetic pole, and the first magnetic pole and the second magnetic pole are arranged along an optical axis of the optical member, wherein in a direction of the optical axis, the thickness of the first magnetic pole is less than the thickness of the second magnetic pole.

18. The optical member driving mechanism as claimed in claim 17, wherein the first magnetic member comprises an additional first magnetic pole and an additional second magnetic pole, the additional first magnetic pole and the additional second magnetic pole are arranged along the optical axis of the optical member, wherein in the direction of the optical axis, the thickness of the additional first magnetic pole is the same as the thickness of the additional second magnetic pole.

19. The optical member driving mechanism as claimed in claim 15, wherein the optical member driving mechanism further comprises a circuit component, and the circuit component comprises:

a fixed section, disposed on the fixed portion;

an assembly section, disposed on the movable portion, wherein the first driving coil or the second driving coil is disposed on the assembly section; and a connecting section, connected to the fixed section and the assembly section, wherein the connecting section is flexible.

\* \* \* \* \*